(12) United States Patent
Zhai

(10) Patent No.: US 9,634,717 B2
(45) Date of Patent: Apr. 25, 2017

(54) SINGLE LOCAL OSCILLATOR ARCHITECTURE FOR DUAL-BAND MICROWAVE/MILLIMETER-WAVE TRANSCEIVER

(71) Applicant: Huawei Technologies Co., Ltd., Shenzhen, Guangdong (CN)

(72) Inventor: Wenyao Zhai, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 43 days.

(21) Appl. No.: 14/664,568

(22) Filed: Mar. 20, 2015

(65) Prior Publication Data
US 2016/0277058 A1    Sep. 22, 2016

(51) Int. Cl.
*H04B 1/40* (2015.01)
*H04B 1/44* (2006.01)

(52) U.S. Cl.
CPC ..................... *H04B 1/44* (2013.01)

(58) Field of Classification Search
CPC .............. C12N 15/8282; C12N 15/113; C12N 2310/14; C12N 15/8218; C12N 15/8285; C12N 15/8286; C12N 15/8281; C12N 15/8283; A01N 57/16; A01N 61/00; A01N 63/02; A01N 63/04; A01N 57/10; C07K 14/37
USPC .......................................... 455/86
See application file for complete search history.

(56) References Cited

FOREIGN PATENT DOCUMENTS

| CN | 103051585 A | 4/2013 |
|---|---|---|
| CN | 103188202 A | 7/2013 |
| EP | 2590333 A2 | 5/2013 |

*Primary Examiner* — Xin Jia
(74) *Attorney, Agent, or Firm* — Slater Matsil, LLP

(57) ABSTRACT

Systems for a dual-band transceiver that re-uses a lower frequency transmitter to drive a local oscillator (LO) for high frequency circuits are disclosed herein. The need for a LO lineup requiring high frequency and high power is eliminated. The output of a lower frequency band is modified to be used as a LO drive for the higher frequency band transceiver. Using a carrier recovery loop, the system is operable to simultaneously operate in both bands. The result is a solution that eliminate the design of a high performance LO circuits for a higher band of a mmW dual-band system. This significantly reduces the overall complexity of the system. Furthermore, the inventive architecture reduces the design complexity and overall cost to implement dual-band circuit.

19 Claims, 11 Drawing Sheets

SINGLE LOCAL OSCILLATOR ARCHITECTURE FOR DUAL-BAND MICROWAVE/MILLIMETER-WAVE TRANSCEIVER

FIELD

Embodiments of the present invention generally relate to the field of wireless transceivers. More specifically, embodiments of the present invention relate to dual-band microwave/millimeter-wave (mmW) transceivers.

BACKGROUND

In dual-band systems, such as systems that include a local multipoint distribution service (LMDS), which generally operates between 27.5 and 31.3 GHz, and E-band mode, which generally operates between 71 and 86 GHz, the range of communication is limited by the linearity (e.g., transmit power) of the higher frequency band (e.g., E-band). This is because at high frequencies, it is difficult to provide sufficient linear power and path loss is relatively high. Further, the local oscillator (LO) frequency is also high and requires high LO power to drive an E-band mixer. As a result, the LO lineup design is analogous to implementing another high power/frequency transmitter, which is very costly.

In contrast to the LO lineup design, it is relatively easy to obtain high power for devices that operate in the LMDS band (27.5-31.3 GHz) as compared with a high mmW frequency band, such as E-band. Previous approaches referred to as "sliding LO" architectures suffer from several drawbacks, including imaging problems, being limited in frequency selection, involve complicated frequency planning, and require a high powered LO drive.

In a dual-band microwave/millimeter-wave (mmW) transceiver design, the local oscillator (LO) is difficult to design because the LO frequency is related to the mmW carrier frequency. Therefore, the power required to drive the mmW mixer is very high.

SUMMARY

The present disclosure describes embodiments of a dual-band transceiver design that re-uses a lower frequency transmitter for a local oscillator (LO) in high frequency circuits. In this way, an LO lineup requiring high frequency and high power may be eliminated. Embodiments of the present invention make use of a lower frequency band output and modify the output to be advantageously re-used as the LO drive for a higher frequency band transceiver. Using a carrier recovery loop, the system may simultaneously operate in both bands. In this way, the power requirements of a dual-band system are reduced without significantly increasing the overall complexity of the system. Furthermore, the proposed novel architecture potentially reduces the design complexity and overall cost to implement the dual-band circuit and system.

According some embodiments, a dual-band transmitter is disclosed that has a baseband circuit producing a modulated signal and a continuous wave (CW) tone and a first transmitter circuit. The first transmitter circuit has a first mixer coupled to the baseband circuit and driven by a local oscillator to up-convert the CW tone or the modulated signal, and a first amplifier coupled to the first mixer and a switch having a first pole and a second pole, where the first amplifier amplifies the modulated signal to generate an amplified first signal and the first pole is coupled to an antenna to transmit the amplified first signal. The dual-band transmitter also has a second transmitter circuit having a passive frequency multiplier coupled to the second pole of the switch, a local oscillator filter coupled to the passive frequency multiplier to filter spurious emissions, a second mixer coupled to the baseband and the local oscillator filter to up-convert the modulated signal, and a second amplifier coupled to the second mixer to amplify the modulated signal to generate an amplified second signal. The amplified modulated signal is transmitted by an antenna.

According another approach, a dual-band receiver is disclosed that has a baseband system producing a continuous wave (CW) tone and a first receiver circuit having a first mixer driven by a local oscillator to up-convert the CW tone, where the first mixer is coupled to the baseband system and a switch having a first pole and a second pole, and a first amplifier coupled to an antenna and the first pole of the switch, where the first amplifier amplifies a signal received by the antenna. The dual-band receiver also has a second receiver circuit having a second amplifier coupled to the second pole of the switch to amplify the up-converted CW tone, a passive frequency multiplier coupled to the second amplifier, a local oscillator filter coupled to the passive frequency multiplier to filter spurious emissions, a second mixer coupled to the baseband and the local oscillator filter to down-convert the received signal, and a third amplifier coupled to the third mixer and to the antenna to amplify a signal received by the antenna.

According another approach, a bi-directional dual-band transceiver is disclosed that has a baseband circuit producing a modulated signal and a continuous wave (CW) tone and a first transceiver circuit having a first mixer coupled to the baseband and driven by a local oscillator to up-convert or down-convert the signal and a first amplification module having a first amplifier and a second amplifier, where a first switch is used to selectively couple the first amplifier to the first mixer and an antenna, and where a second switch is used to selectively couple the second amplifier to the first mixer and the antenna. The bi-directional dual-band transceiver also has a second transceiver circuit having a second mixer coupled to the baseband circuit to down-convert or up-convert the modulated signal, a third switch to selectively couple the amplification module and the second mixer, and a second amplification module comprising a third amplifier and a fourth amplifier. A fourth switch is used to selectively couple the third amplifier to the second mixer and the antenna, and a second switch is used to selectively couple the fourth amplifier to the second mixer and the antenna.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

According to some embodiments, systems having a dual-band transceiver capable of reusing a lower frequency transmitter to drive a local oscillator (LO) for high frequency circuits are disclosed. In accordance with embodiments of the present invention, a LO lineup requiring high frequency and high power drive is eliminated, and a lower frequency band output is modified to be re-used as the LO drive for a higher frequency band transceiver. According to some embodiments, other elements (e.g., a carrier recovery loop, a directional coupler and switch) are implemented and the system may simultaneously operate in both bands. This advantageously reduces power requirements of the dual-band system without significantly increasing the overall complexity. Furthermore, embodiments of the present invention potentially reduce the design complexity and overall cost to implement dual-band circuits.

Figure 1A:
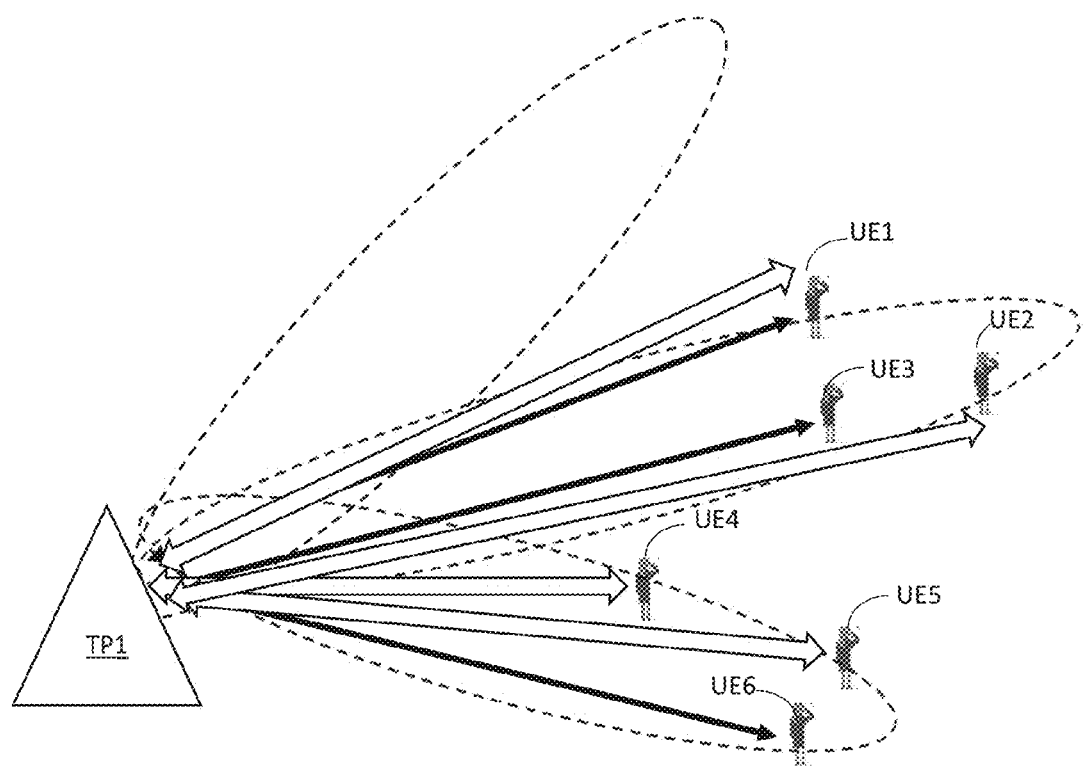
FIG. 1A is a block diagram illustrating an exemplary wireless network comprising dual-band transceivers according to embodiments of the present invention.

With regard to FIG. 1A, an exemplary wireless network 100 for serving a plurality of user equipment (UEs) (e.g., UE1-UE6) is depicted according to embodiments of the present invention. TP1 comprises dual band, single-LO mmW transceivers operating in both E-band and Local Multipoint Distribution Service (LMDS) modes for generating E-band and LMDS signals. The dashed lines represent coverage areas that can be serviced by the transceivers. The white arrows represent E-band signals, and the black arrows represent LMDS signals. UE2, UE4, and UE5 each receive an E-band signal, and UE3 and UE6 receive LMDS signals. Some UEs (e.g., UE1) may receive both E-band and LMDS signals, or alternate between the two depending on network conditions.

Figure 1B:
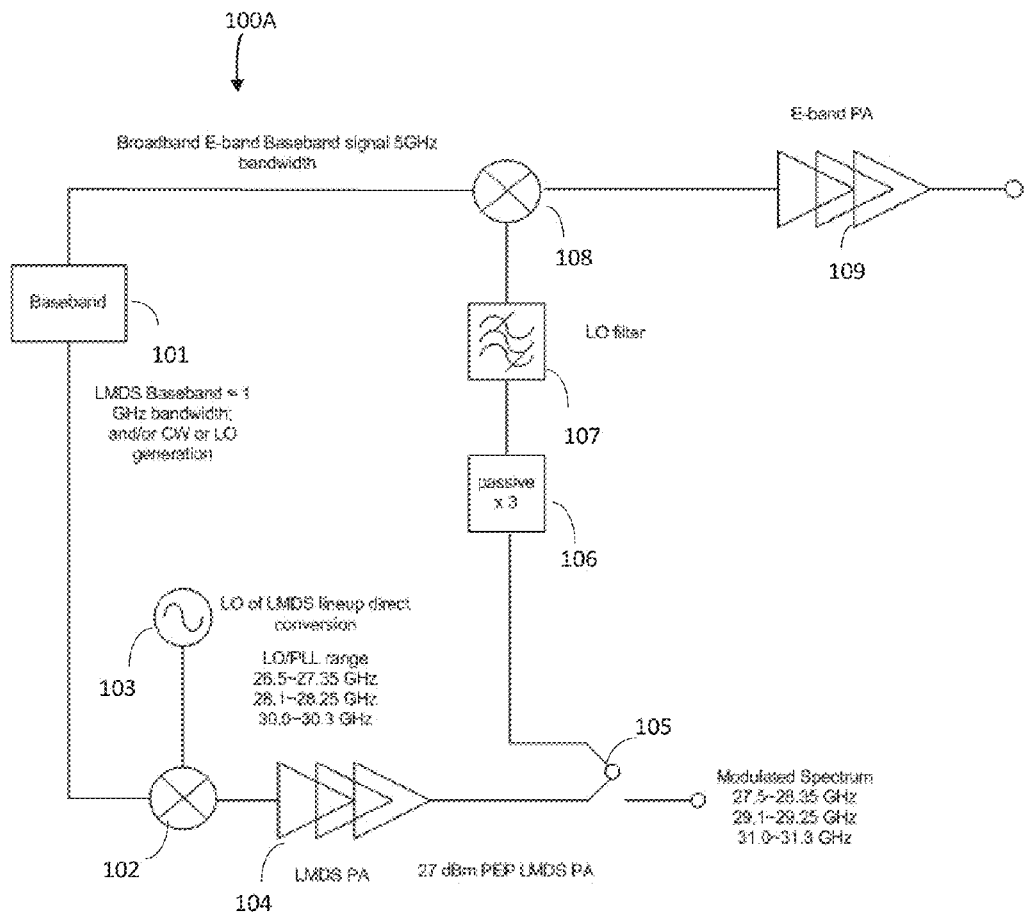
FIG. 1B is a block diagram illustrating an exemplary dual-band transmitter design according to embodiments of the present invention.

With regard to FIG. 1B, an exemplary single mode transmitter design 100B is depicted according to embodiments of the present invention. According to the depicted embodiment, the transmitter 100B operates (e.g., transmits) on a single band at a time (e.g., LMDS or E-band). Baseband circuit 101 produces a modulated signal and a continuous wave (CW) signal. During LMDS band operation, a modulated signal is produced in baseband circuit 101, directly up-converted by LMDS band mixer 102 driven by local oscillator 103, amplified by LMDS power amplifier (PA) 104, and is then passed to an antenna for transmission through switch 105. Switch 105 may be any suitable switch and may be a double-pole, single-throw switch, as depicted in FIG. 1B, for instance. Switch 105 selectively couples (e.g., toggles) the transmitters to the antenna for LMDS operation or E-band operation based on current system requirements. These requirements may change over time, causing the switch to toggle to the appropriate mode of operation. According to some embodiments, a control signal is received by the switch, causing the switch to selectively toggle between modes.

During E-band operation, a CW tone is generated at the baseband circuit 101 and is up-converted to the LMDS band by an LMDS band circuit. The output of LMDS power amplifier 104 is used to drive passive frequency multiplier 106 and E-band mixer 108. Passive frequency multiplier 106 may be a 3× frequency multiplier, for example. LO band pass filter 107 is coupled between E-band mixer 108 and frequency multiplier 106 for filtering unwanted spurious emissions produced by the LMDS band circuits and/or the passive frequency multiplier 106. E-band mixer 108 up-converts the E-band baseband signal and E-band power amplifier 109 amplifies the up-converted signal to be transmitted by an antenna during E-band operation. In this way, the output of a lower frequency transmitter (e.g., an LMDS transmitter) is advantageously used to drive the LO for a mixer (e.g., E-band mixer 108) of a high frequency circuit (e.g., an E-band transmitter). Switch 105 is used to toggle between LMDS and E-band operation.

Figure 1C:
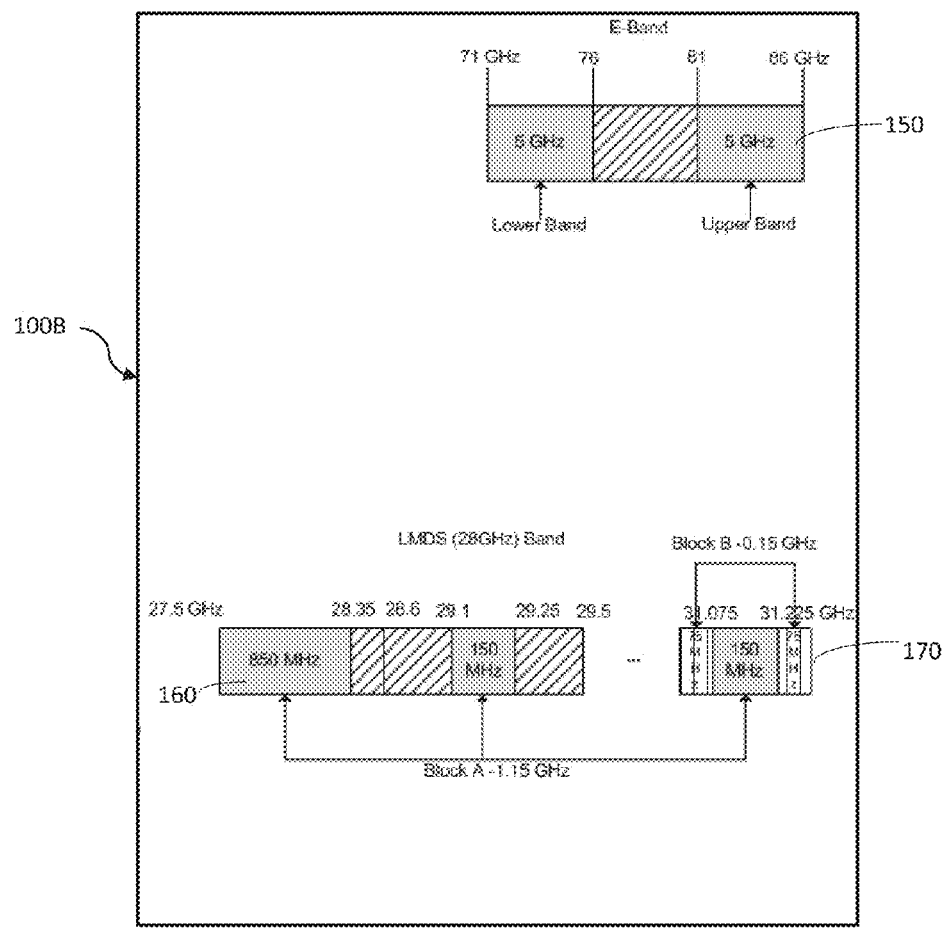
FIG. 1C is a frequency/spectrum diagram depicting an exemplary frequency plan for embodiments as depicted in FIG. 1B.

With regard to FIG. 1C, a frequency/spectrum diagram depicts an exemplary frequency plan 100C for the transmitter embodiment depicted in FIG. 1B. According to one embodiment, the E-band spectrum 150 has a lower band between 71 GHz and 76 GHz and an upper band between 81 GHz and 86 GHz. The 28 GHz LMDS band has a 1.15 GHz Block A 160 and a 0.15 GHz Block B 170, where Block A 160 has values between 27.5 and 28.35 GHz, 29.1 and 29.25 GHz, and 31.075 and 31.225 GHz. Block B 170 has values between 31.075 and 31.225.

Figure 2A:
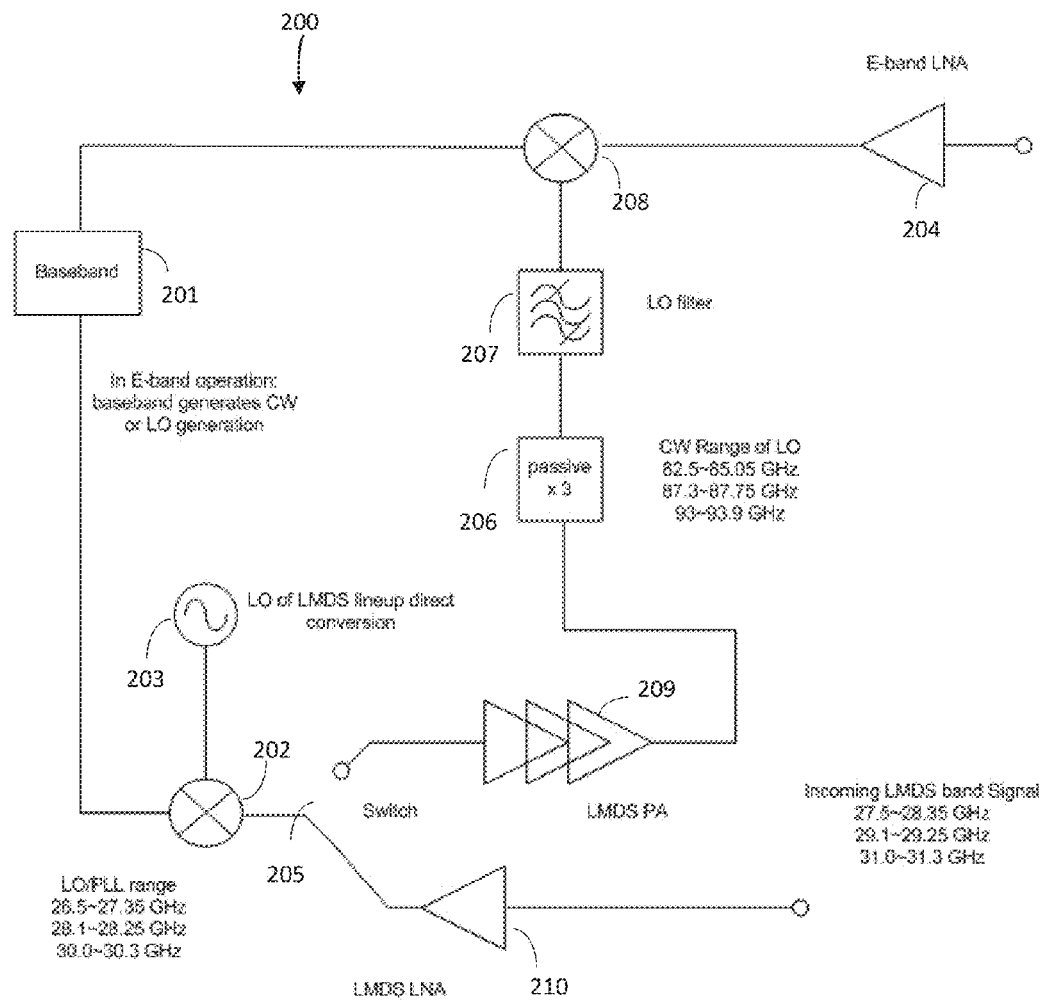
FIG. 2A is a block diagram illustrating an exemplary receiver lineup design according to embodiments of the present invention.

With regard to FIG. 2A, an exemplary receiver deign 200 is depicted according to an embodiment of the present invention. Receiver 200 is similar to the exemplary transmitter 100B (see FIG. 1B). According to the depicted embodiment, the receiver 200 operates on (e.g., receives) a single band at a time (e.g., LMDS band or E-band). A LO 203 directly down converts LMDS band mixer 202. During LMDS operation, LMDS Low Noise Amplified (LNA) 210 amplifies the received signal. During E-band operation, a CW is generated by baseband circuit 201, up-converted by LMDS band mixer 202, amplified through the LMDS amplifier 209, used to drive the passive 3× frequency multiplier 206, and filtered by LO filter 207 to drive E-band down-converter 208.

A lower frequency receiver (e.g., an LMDS receiver) is advantageously used to drive the LO for a high frequency circuit (e.g., an E-band receiver). E-band LNA 204 amplifies the received signal. Switch 205 is used to toggle between LMDS and E-band operation. As described above, switch 205 may be a double-pole, single-throw, as depicted in FIG. 2A.

Figure 2B:
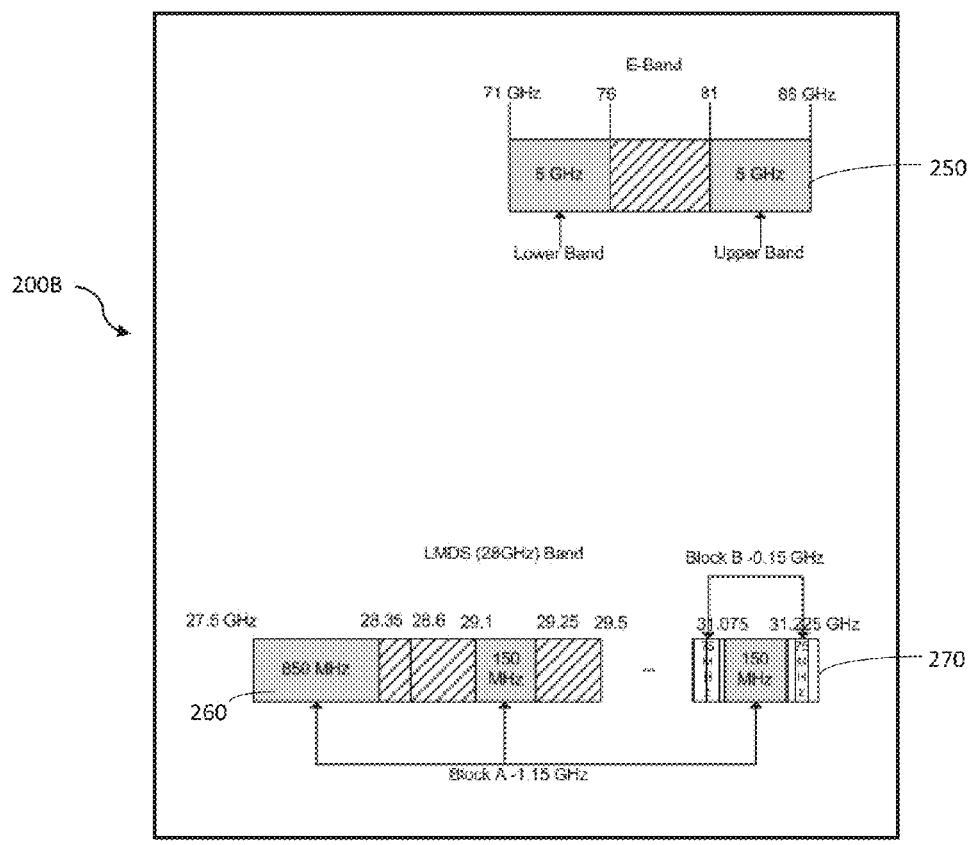
FIG. 2B is a frequency/spectrum diagram depicting an exemplary frequency plan for embodiments as depicted in FIG. 2A.

With regard to FIG. 2B, a frequency/spectrum diagram depicts an exemplary frequency plan 200B for the embodiment depicted in FIG. 2A. According to some embodiments, the E-band spectrum 250 has a lower band between 71 GHz and 76 GHz and an upper band between 81 GHz and 86 GHz. The 28 GHz LMDS band has a 27 GHz Block A 260 and a 0.15 GHz Block B 270, where Block A 260 has values between 27.5 and 28.35 GHz, 29.1 and 29.25 GHz, and 31.075 and 31.225 GHz. Block B 270 has values between 31.075 and 31.225.

Figure 3A:
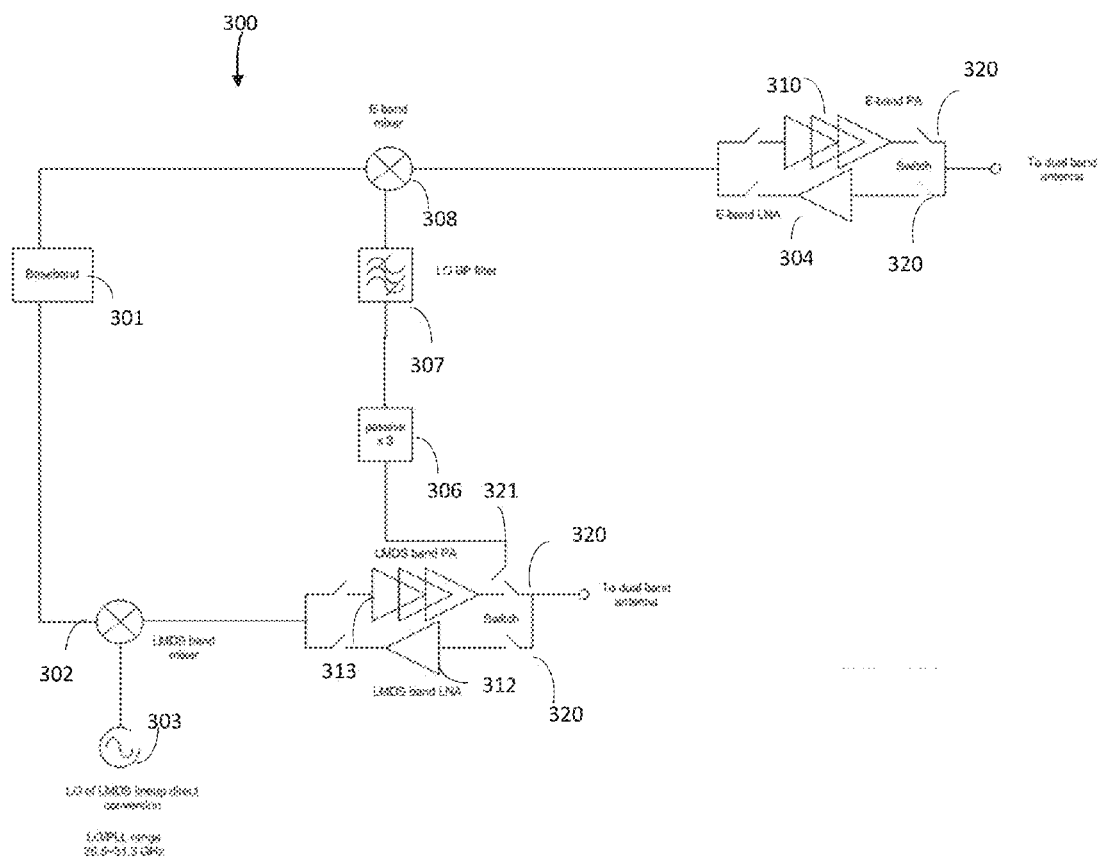
FIG. 3A is a block diagram illustrating an exemplary bi-directional transceiver design according to embodiments of the present invention.

With regard to FIG. 3A, an exemplary bi-directional transceiver design 300 is depicted according to one embodiment of the present invention. For E-band operation, double-pole, double-throw switches 320 are used to toggle between transmit and receive operations. A CW is generated by baseband circuit 301, up-converted by LMDS band mixer 302 driven by LO 303, multiplied by passive 3× frequency multiplier 306, and filtered by LO filter 307 to drive E-band mixer (e.g., down-converter) 308.

A lower frequency (e.g., an LMDS) is used to advantageously drive the LO for a high frequency circuit (e.g., an E-band). Switch 321 may be a single-throw switch and is used to toggle between E-band and LMDS modes of operation. During transmit operation, E-band power amplifier 310 amplifies the signal for transmission through a dual-band antenna (not pictured). While operating in receive mode, E-band low noise amplifier 304 amplifies a signal received from a dual-band antenna, and LO generation is identical to LO generation for a transmit operation. For LMDS band operation, switches 320 are used to toggle between transmit and receive operations, as well as LO generation (for E-band). Switches 320 may be double-pole, double-throw switches. During a transmit operation, LMDS band power amplifier 313 amplifies the signal for transmission through a dual-band antenna (not pictured).

While operating in a receive mode, LMDS band low noise amplifier 312 amplifies the signal received from a dual-band antenna. Together, the amplifiers and the switches coupled thereto may be referred to as an amplification module.

Figure 3B:
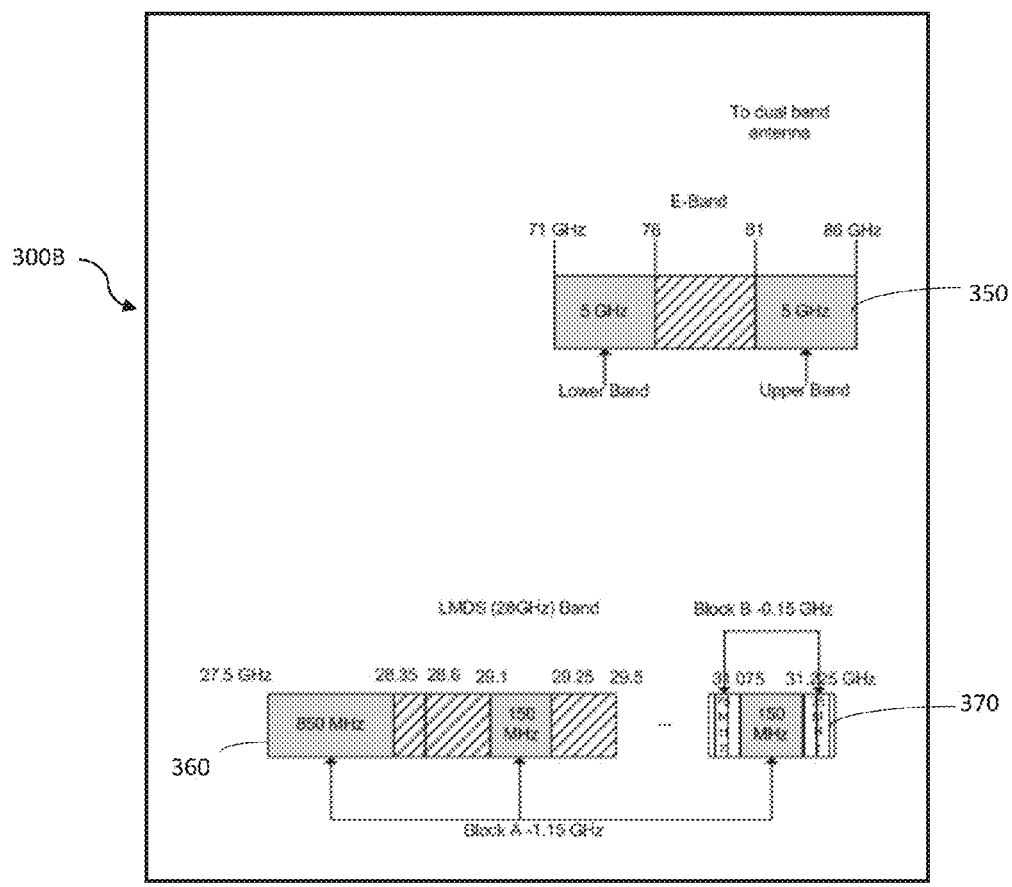
FIG. 3B is a frequency/spectrum diagram depicting an exemplary frequency plan for the embodiment depicted in FIG. 3A.

With regard to FIG. 3B, a frequency/spectrum diagram depicts an exemplary frequency plan 300B for the embodiment depicted in FIG. 3A. According to one embodiment, the E-band spectrum 350 has a lower band between 71 GHz and 76 GHz and an upper band between 81 GHz and 86 GHz. The 28 GHz LMDS band has a 27 GHz Block A 360 and a 0.15 GHz Block B 370, where Block A 360 has values between 27.5 and 28.35 GHz, 29.1 and 29.25 GHz, and 31.075 and 31.225 GHz. Block B 370 has values between 31.075 and 31.225.

Figure 4A:
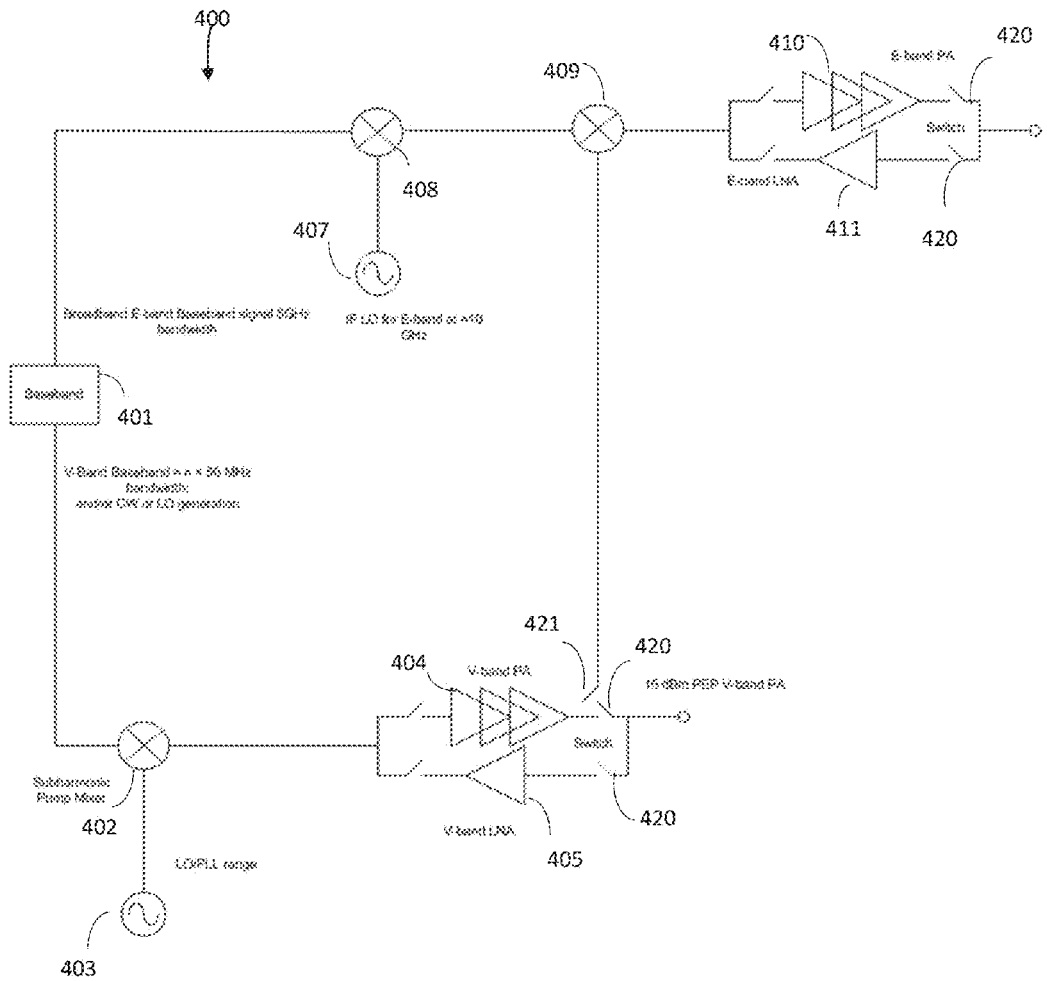
FIG. 4A is a block diagram illustrating an exemplary E/V-band dual-band bi-directional transceiver system according to embodiments of the present invention.

With regard to FIG. 4A, an exemplary E-band and V-band dual-band system 400 is depicted according to embodiments of the present invention. The depicted dual-band system 400 allows a V-band output to be used to drive an E-band mixer 409. According to one embodiment, the E-band is a super-heterodyne architecture. An intermediate frequency LO 407 is used to drive intermediate E-band mixer 408 to up-convert and/or down-convert the E-band signal. The RF LO is at or around 61 GHz, the E-band baseband is converted to a value between 12.5 and 22.5 GHz. In V-band operation, a dicon architecture may be used. Switch 421 is used to toggle between E-band and V-band/LO generation, and switches 420 are used to toggle between transmit and receive modes. E-band low noise amplifier (LNA) 411 amplifies a received signal in receive mode, and E-band amplifier 410 amplifies the signal for transmission in transmit mode. In this way, a lower frequency transceiver (e.g., a V-band transceiver) is advantageously used to drive the LO for a high frequency circuit (e.g., a E-band transceiver). During V-band operation, a modulated signal is produced in baseband circuit 401 and up-converted by subharmonic pump mixer 402 driven by local oscillator 403. V-band LNA 405 amplifies a received signal when in receive mode, and V-band amplifier 404 amplifies a signal for transmission when in transmit mode.

Figure 4B:
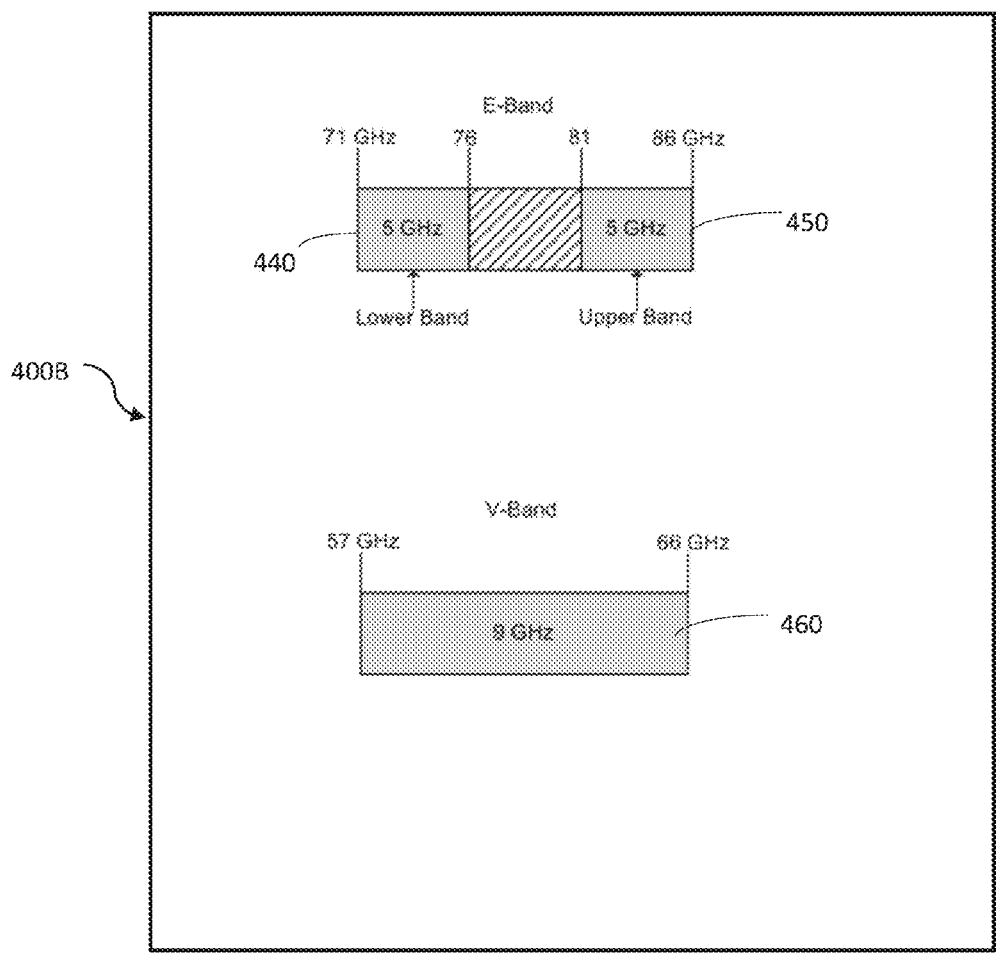
FIG. 4B is a frequency/spectrum diagram depicting an exemplary frequency plan for the embodiment depicted in FIG. 4A.

With regard to FIG. 4B, a frequency/spectrum diagram depicts an exemplary frequency plan 400B for the embodiment depicted in FIG. 4A. According to one embodiment, the E-band spectrum has a lower band 440 between 71 GHz and 76 GHz and an upper band 450 between 81 GHz and 86 GHz. The V-band 460 has values between 57 GHz and 66 GHz.

Figure 5A:
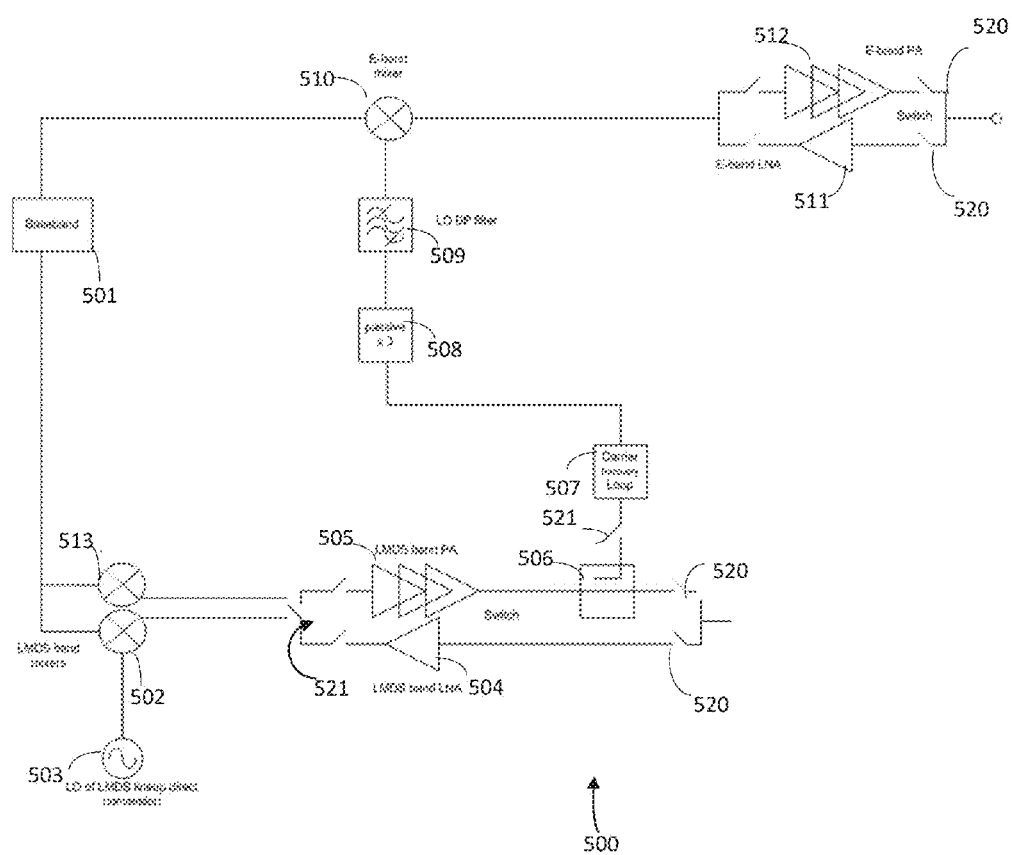
FIG. 5A is a block diagram illustrating an exemplary dual-band transceiver circuit for simultaneous LMDS and E-band operation according to embodiments of the present invention.

With regard to FIG. 5A, an exemplary dual-mode circuit 500 for simultaneous LMDS and E-band generation is disclosed. The embodiment depicted in FIG. 5A is analogous to the embodiment depicted in FIG. 3A, with the addition of a directional coupler 506 and a carrier recovery loop 507 used to recover a modulated LMDS signal back to a carrier CW signal during LMDS operation. During E-band operation, a CW is generated by baseband circuit 501, up-converted by LMDS band mixer 502 driven by LO 503, multiplied by passive 3× frequency multiplier 508, and filtered by LO filter 509 to drive E-band mixer (e.g., down-converter) 510.

In receive mode, LMDS band mixer 513 is used to generate a separate CW tone as LO for E-band down-conversion and may be connected by switch 521. In this way, a lower frequency transmitter is advantageously used to drive the LO for a high frequency circuit.

According to one embodiment, directional coupler 506 couples a defined amount of the electromagnetic signal power in the transmission line medium to a port enabling the signal to be used in another circuit. A directional coupler couples power flowing in only one direction. Power entering an input port may be coupled to a coupled port and not to an isolated port. Power exits at the output port, and power entering an output port is coupled to an isolated port but not to a coupled port. Power also exits at the input port.

Still with regard to FIG. 5A, during transmit operation, E-band power amplifier 512 amplifies the signal for transmission through a dual-band antenna (not pictured). While operating in a receive mode, E-band low noise amplifier 511 amplifies a signal received from a dual-band antenna. For LMDS band operation, switches 520 may be double-pole, double-throw switches used to toggle between transmit and receive operations, as well as LO generation (for E-band). During transmit operation, LMDS band power amplifier 505 amplifies the signal for transmission through a dual-band antenna (not pictured). While operating in receive mode, LMDS band low noise amplifier 504 amplifies the signal received from a dual-band antenna. Together, the amplifiers and the switches coupled therein may be referred to as an amplification module.

Figure 5B:
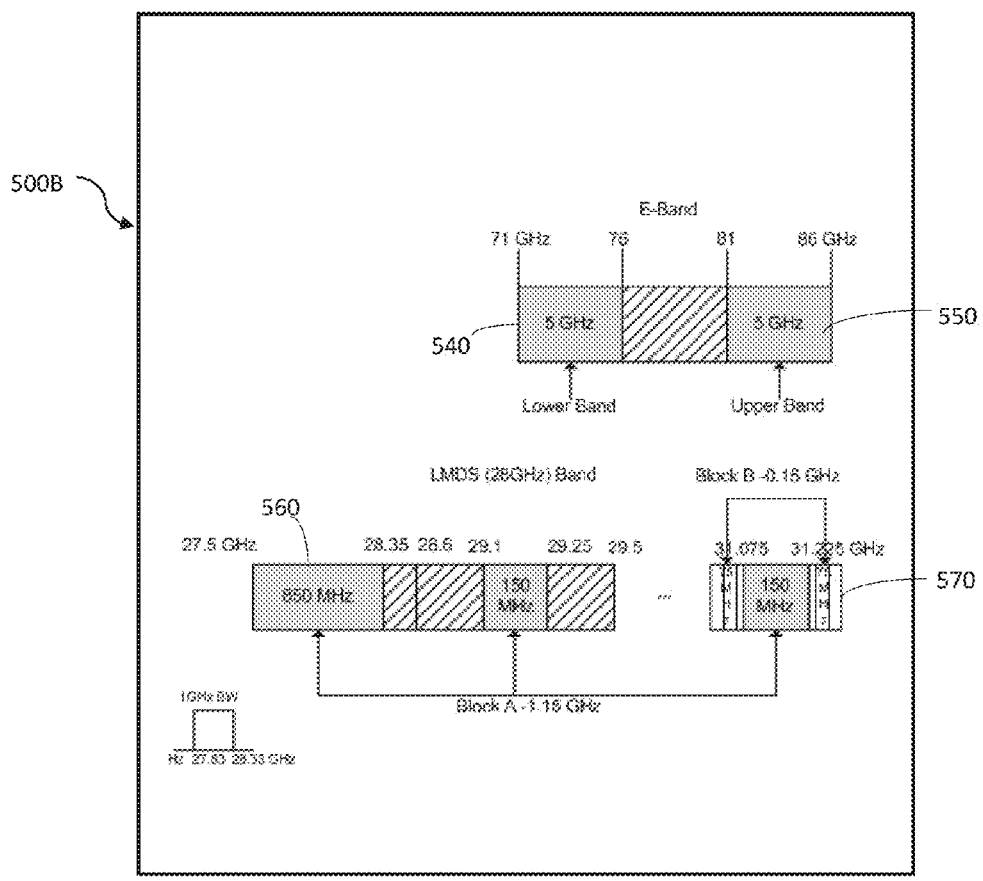
FIG. 5B is a frequency/spectrum diagram depicting an exemplary frequency plan for various embodiments involving those as depicted in FIG. 5A.

With regard to FIG. 5B, a frequency/spectrum diagram depicts an exemplary frequency plan 500B for the embodiment depicted in FIG. 5A. According to some embodiments, the E-band spectrum has a lower 540 band between 71 GHz and 76 GHz and an upper band 550 between 81 GHz and 86 GHz. According to one embodiment, the 28 GHz LMDS band has a 27 GHz Block A 560 and a 0.15 GHz Block B 570, where Block A 560 has values between 27.5 and 28.35 GHz, 29.1 and 29.25 GHz, and 31.075 and 31.225 GHz. Block B 570 has values between 31.075 and 31.225.

Embodiments of the present invention are thus described. While the present invention has been described in particular embodiments, it should be appreciated that the present invention should not be construed as limited by such embodiments, but rather construed according to the following claims.

What is claimed is:

1. A bi-directional dual-band transceiver, comprising:
   a baseband circuit producing a modulated signal and a continuous wave (CW) tone;
   a first transceiver circuit comprising:
      a first mixer coupled to the baseband circuit and driven by a local oscillator to selectively up-convert from and down-convert to the CW tone; and
      a first amplification module comprising a first amplifier and a second amplifier, wherein a first switch is used to selectively couple the first amplifier to the first mixer and an antenna, and a second switch is used to selectively couple the second amplifier to the first mixer and the antenna; and
   a second transceiver circuit comprising:
      a second mixer coupled to the baseband circuit and operable to selectively down-convert to and up-convert from the modulated signal;
      a third switch to selectively couple the first amplification module and the second mixer; and
      a second amplification module comprising a third amplifier and a fourth amplifier, wherein a fourth switch is used to selectively couple the third amplifier to the second mixer and the antenna, and a fifth switch is used to selectively couple the fourth amplifier to the second mixer and the antenna.

2. The transceiver of claim 1, wherein the first, second, fourth, and fifth switches are double-pole double-throw switches and the third switch is a single-throw switch.

3. The transceiver of claim 1, further comprising a passive frequency multiplier coupled between the third switch and a local oscillator filter, wherein the local oscillator filter is coupled to the passive frequency multiplier and the second mixer and operable to drive the second mixer, and wherein the third switch open causes operation in a first band mode, and the third switch closed causes operation in a second band mode in which a signal generated by the first amplifier is used to drive the second mixer.

4. The transceiver of claim 3, wherein the first, second, fourth, and fifth switches are selectively toggled causing selective receive mode and transmit mode operation.

5. The transceiver of claim 3, further comprising a directional coupler coupled to a carrier recovery loop which is coupled between the first amplification module and the passive frequency multiplier, wherein the directional coupler and the carrier recovery loop are operable to recover a modulated local multipoint distribution service (LMDS) signal back to a carrier CW signal when the operation is in the second band mode.

6. The transceiver of claim 5, further comprising a third mixer coupled to the baseband circuit and a sixth switch, wherein the sixth switch selectively couples the first amplification module to one of the first mixer and the third mixer.

7. The transceiver of claim 6, wherein the third mixer is operable in receive mode to generate a second CW tone for down-converting as a second local oscillator.

8. The transceiver of claim 7, wherein the first or fourth switch closed causes operation in a transmit mode, and the second or fifth switch closed causes operation in a receive mode.

9. The transceiver of claim 3, wherein the passive frequency multiplier is operable to generate a millimeter wave (mmW) output frequency.

10. The transceiver of claim 3, wherein the local oscillator filter is operable to filter spurious emissions.

11. The transceiver of claim 1, further comprising an intermediate frequency local oscillator operable to drive a third mixer, wherein the third mixer is coupled between the baseband circuit and the second mixer and is operable to up or down convert the modulated signal to or from, respectively, an intermediate frequency between 12.5 and 22.5 GHz, and wherein further the first transceiver circuit is a V-band circuit and the first mixer is a V-band mixer.

12. The transceiver of claim 11, wherein the third switch open causes operation in a first band mode, and the third switch closed causes operation in a second band mode in which a signal generated by the first amplifier is operable to drive the second mixer.

13. The transceiver of claim 1, wherein the first amplification module is a local multipoint distribution service (LMDS) receiver circuit, the first mixer is an LMDS band mixer, the second amplification module is an E-band receiver circuit, and the second mixer is an E-band mixer.

14. The transceiver of claim 1, wherein the antenna is a dual-band antenna.

15. The transceiver of claim 1, wherein the first and third amplifiers are power amplifiers, and wherein the second and fourth amplifiers are low noise amplifiers.

16. A bi-directional dual-band transceiver, comprising:
   a baseband circuit producing a modulated signal and a continuous wave (CW) tone;
   a first transceiver circuit comprising:
      a first mixer coupled to the baseband circuit and driven by a local oscillator to selectively up-convert from and down-convert to the CW tone; and
      a first amplifier;
      a first switch to selectively couple the first amplifier to the first mixer and an antenna;
      a second amplifier; and
      a second switch to selectively couple the second amplifier to the first mixer and the antenna;
   a second transceiver circuit comprising:
      a second mixer coupled to the baseband circuit and operable to selectively down-convert to and up-convert from the modulated signal;
      a third switch to selectively couple the first amplification module and the second mixer;
      a third amplifier;
      a fourth switch to selectively couple the third amplifier to the second mixer and the antenna;
      a fourth amplifier; and
      a fifth switch to selectively couple the fourth amplifier to the second mixer and the antenna;
   an intermediate frequency local oscillator operable to drive a third mixer; and the third mixer coupled between the baseband circuit and the second mixer, and operable to up or down convert the modulated signal to or from, respectively, an intermediate frequency.

17. The bi-directional dual-band transceiver of claim 16, wherein the third switch open causes operation in a first band mode, and the third switch closed causes operation in a second band mode in which a signal generated by the first amplifier is operable to drive the second mixer.

18. A bi-directional dual-band transceiver, comprising:
a baseband circuit producing a modulated signal and a continuous wave (CW) tone;
a first transceiver circuit comprising:
a first mixer coupled to the baseband circuit and driven by a local oscillator to selectively up-convert from and down-convert to the CW tone; and
a first amplifier;
a first switch to selectively couple the first amplifier to the first mixer and an antenna;
a second amplifier; and
a second switch to selectively couple the second amplifier to the first mixer and the antenna;
a second transceiver circuit comprising:
a second mixer coupled to the baseband circuit and operable to selectively down-convert to and up-convert from the modulated signal;
a third switch to selectively couple the first amplification module and the second mixer;
a third amplifier;
a fourth switch to selectively couple the third amplifier to the second mixer and the antenna;
a fourth amplifier; and
a fifth switch to selectively couple the fourth amplifier to the second mixer and the antenna;
a passive frequency multiplier coupled between the third switch and a local oscillator filter; and
the local oscillator filter, coupled to and operable to drive the second mixer.

19. The bi-directional dual-band transceiver of claim 18, wherein the first, second, fourth, and fifth switches are double-pole double-throw switches, and the third switch is a single-throw switch.

* * * * *